Sept. 4, 1962　　　O. DITTRICH ET AL　　　3,052,132
CONTROL MECHANISM FOR INFINITELY VARIABLE GEARS
Filed Dec. 10, 1959　　　　　　　　　　　　　3 Sheets-Sheet 2
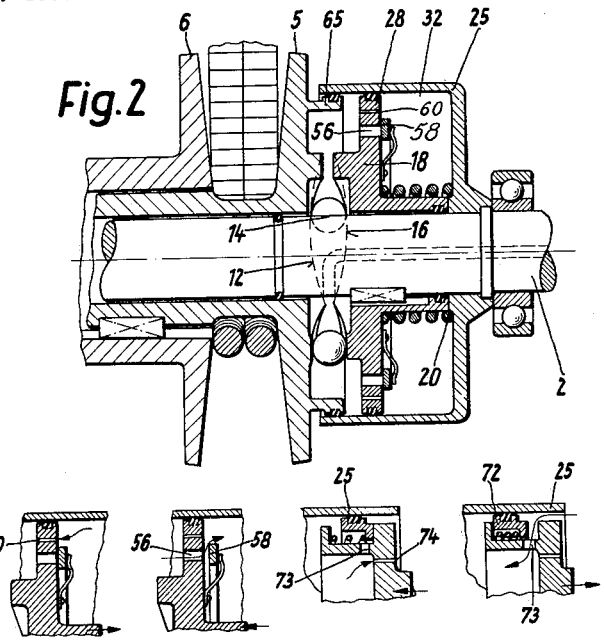
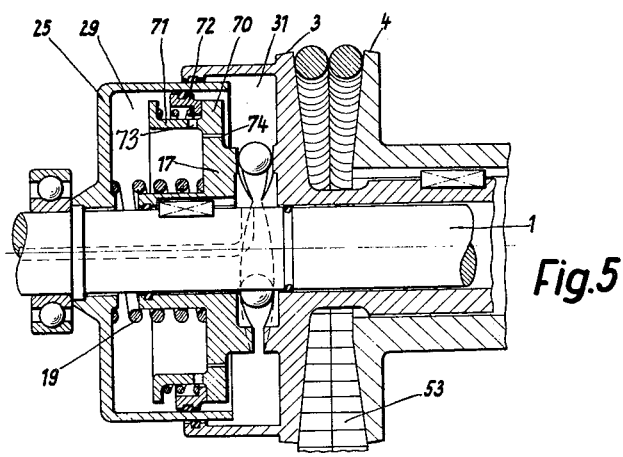
INVENTORS
Otto Dittrich, Rudolf Schrod,
AND ERHARDT KARIG
BY
Bailey, Stephens & Huettig
ATTORNEYS Sept. 4, 1962     O. DITTRICH ET AL     3,052,132
CONTROL MECHANISM FOR INFINITELY VARIABLE GEARS
Filed Dec. 10, 1959     3 Sheets-Sheet 3
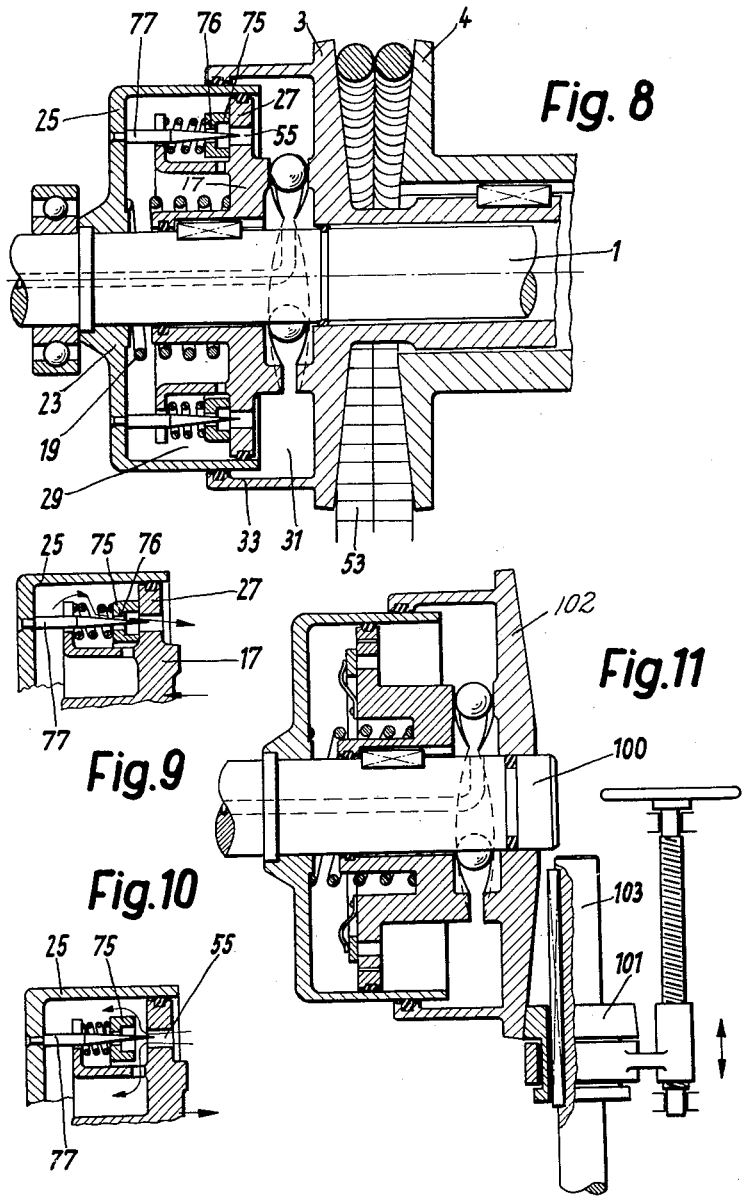
INVENTORS
Otto Dittrich, Rudolf Schrod
AND ERHARDT KARIG
BY
Bailey, Stephens & Huettig
ATTORNEYS

United States Patent Office 3,052,132
Patented Sept. 4, 1962

3,052,132
CONTROL MECHANISM FOR INFINITELY
VARIABLE GEARS
Otto Dittrich, Bad Homburg vor der Hohe, Rudolf
Schrodt, Kronberg (Taunus), and Erhardt Karig, Bad
Homburg vor der Hohe, Germany, assignors to Reimers-Getriebe KG., Ascona, Switzerland, a firm of
Switzerland
Filed Dec. 10, 1959, Ser. No. 858,638
Claims priority, application Germany Dec. 12, 1958
5 Claims. (Cl. 74—230.17)

The present invention relates to a control mechanism for infinitely variable gears, and more particularly to improvements in a mechanism as described in the co-pending application, Serial No. 826,087, filed on July 9, 1959, now Patent No. 2,993,385, and entitled "Control Device for Infinitely Variable Gears."

The mentioned application described a control mechanism for infinitely variable gears in which the drive shaft and the driven shaft of the gear each carries a pulley which consists of two conical disks, at least one of which is slidable in the axial direction relative to the other disk, so as to act upon a belt or chain between them, and in which the driving side of the gear is subjected to control forces which are dependent upon the load to which the gear is subjected and which are produced by the hydraulic pressure of a pressure fluid so as to maintain and vary the gear ratio, while mechanical pressure-applying devices are provided for producing the axially directed pressure which is required for transmitting the necessary driving friction to the belt or chain which connects the driving and driven parts of the gear, which pressure is dependent upon the torque on the particular gear shaft as well as upon the particular gear ratio to which the gear is being adjusted. Each of these pressure-applying devices comprises at least one pair of helical cam surfaces which have a changing pitch and extend inversely to each other in the peripheral direction in accordance with the two possible directions of the torque which may be acting on the particular shaft.

Gears of this type are usually made in the form of cone-belt pulley drives in which two pulleys, each of which consists at least of a pair of conical disks, are mounted on two parallel gear shafts and are connected to each other by one or more endless belts or chains. Such gears may, however, also be provided with shafts which are disposed at an angle to each other, in which event the conical disks will either be in positive engagement with each other or be indirectly connected to each other by means of suitable friction elements.

The principle of operation of the pressure-applying devices which are used in such gears is known as such and consists of two or more pairs of helically ascending cam surfaces on a cam bushing, which is nonrotatably secured to the shaft, and by means of rolling bodies such as balls which are adapted to roll along these cam surfaces and to act upon other cam surfaces of an identical shape and number which are provided on the hub of a conical disk of a pulley, which disk is nonrotatably mounted on the shaft and is slidable in the axial direction, whereby the torque action upon said shaft is transmitted to the conical disk and at the same time an axially directed pressure is produced which is proportional to the torque acting on the gear shaft and is directed toward the axially fixed pulley disk. The factor of proportionality is determined by the particular angle of inclination or pitch of each of the two or more pairs of associated cam surfaces at the particular point thereon in which they engage with the rolling bodies between them. If the slidable conical disk is shifted in the axial direction to the greatest distance from the fixed pulley disk, the rolling bodies will be disposed at the bottom of the cam surfaces. If this slidable disk is then shifted in the axial direction toward the fixed pulley disk in order to change the gear ratio, the associated cam surfaces on the conical disk and on the cam bushing will be turned relative to each other in the peripheral direction, whereupon the rolling bodies will roll upwardly along the cam surfaces. Since the cam surfaces have a changing pitch, this will result in a change in the factor of proportionality of the conversion of the torque into the axially directed pressure. In this manner it is possible to adapt the contact pressures between the driving and driven parts to the particular prevailing torque and to the particular prevailing gear ratio so that they will always be of an amount as required for transmitting the power by frictional engagement with the best possible efficiency.

If, for example, in a gear of a motor vehicle, the direction of the torque changes while the direction of rotation remains the same, as when the engine no longer drives the vehicle through the gear, for instance, when driving uphill, but the vehicle drives the motor through the gear, as when driving downhill and using the engine as a brake, the rolling bodies of the pressure-applying devices as above described, which transmit the power between the associated cam surfaces, must now engage with the other cam surfaces of each pair which ascend from the bottom in the inverse circumferential direction which results in relatively large idle traveling distances of the rolling bodies depending upon the particular gear ratio as adjusted, that is, the distances which the rolling bodies have to travel during the free angular movement of the shaft until they engage with the corresponding points on the opposite cam surfaces. In order to prevent the rolling bodies at this operation from disengaging from the cam surfaces, the cam bushing is designed in a known manner so as to be slidable in the axial direction along the gear shaft and to be acted upon by a compression spring which presses the cam bushing toward the friction disk so that the rolling bodies will be held in engagement with the cam surfaces and moved downwardly along them to the cam bottom. If the rolling elements then again move upwardly along the opposite shaped cam surfaces of the pair until they reach the new point of operation, the cam bushing will again be forced back by the rolling bodies against the action of the compression spring to its starting position, i.e. to the normal operating position in which it abuts in the axial direction against a flange or the like on the gear shaft.

Although the spring force of the compression spring is counteracting the back movement of the cam bushing and thereby increasing its strength, it has been found that at rapid torque changes, sudden impact stresses will occur when the cam bushing hits against the fixed flange on the shaft, while immediately prior thereto the required axial pressure acting upon the slidable disk will not always be available.

The principal objects of the present invention are to overcome the above-mentioned disadvantages of the pressure applying device of that type of gears in which the control forces, which are required at the respective driving side of the gear for maintaining and varying the gear ratio, are produced hydraulically, and to attain a smooth, shockless movement of the pressure-applying device when a change in torque occurs and also to insure that the available axial pressure will be of an adequate strength during this operation.

These objects are attained according to the invention by providing a cam bushing which forms a part of the pressure-applying device and is mounted on the gear shaft in the usual manner so as to be nonrotatable relative thereto but slidable in the axial direction toward the slidable conical disk under the action of a compression spring, and which is supported in the opposite axial direction by a stop member, and by designing this bushing in the form of a damping piston which is mounted in a cylinder and separates a damping chamber which rotates with the gear shaft, from a likewise rotating pressure chamber in which by means of the pressure fluid the control forces are produced which are dependent upon the load and act upon the slidable cone pulley disk. These objects are further attained by the provision of throttle valves in the damping piston which are active in one direction and are adapted at a change in the direction of the torque during the displacement of the cam bushing in the direction of force of the compression spring, to allow the pressure fluid free access from the pressure chamber into the damping cylinder, while during the subsequent displacement of the cam bushing in the opposite direction these valves force the pressure fluid to flow back from the damping cylinder into the pressure chamber by passing through throttling apertures.

These inventive means insure that, at a change in torque, the cam bushing will, under the action of the compression spring, be shifted quickly and practically without any resistance toward the slidable cone-pulley disk and thereby take the rolling bodies along the cam path down to the cam bottom without, however, disengaging from them during that time, whereas during the return movement of the cam bushing additionally to the spring force very strong hydraulic forces acting in the axial direction will be created since the pressure fluid can then flow back from the damping cylinder to the pressure chamber only through the throttling apertures. During this part of the operation, the damping action very strongly increases the strength of the contact pressure which should be produced by the pressure-applying mechanism but cannot be supplied because the rolling bodies are traveling from one engagement point on one of the cam surfaces to the corresponding engagement point on the opposite cam surfaces of each pair of cam surfaces, which traveling is due to the reversal of the torque. Also at the end of its movement the cam bushing will engage practically without any impact with the flange on the gear shaft.

The effect of this damping mechanism upon the cam bushing will be further increased due to the fact that the control forces which are produced hydraulically within the pressure chamber are of a strength in proportion to the torque acting upon the gear shafts at any particular time. Consequently, these control forces increase to the same extent at which the oppositely directed torque is being built up, and they also contribute to the result that the axial pressure acting upon the slidable cone-pulley disk will never be of a strength less than required, although the rolling bodies will be out of normal operation during that period.

A preferred embodiment of the present invention comprises a damping cylinder which is open at one side and connected to the gear shaft so as not to be displaceable in the axial direction thereof and which also serves as the fixed part of the pressure chamber for producing the hydraulic control forces, while the movable part of this chamber is formed by the axially slidable cone-pulley disk having a cylindrical flange which is slidably mounted within or on the damping cylinder.

The one-way throttle valves which are mounted in the damping piston may be of various types of construction. Thus, for example, they may consist of a plurality of relatively large apertures which are closed at the side of the damping chamber of the cylinder by means of a spring-loaded annular valve plate, and of throttling apertures of a small cross section within the damping piston or the valve plate. According to another embodiment of the invention, tapering throttling pins which are rigidly secured to the damping cylinder extend into the throttling apertures in the damping piston or valve plate and are adapted gradually to reduce the cross-sectional area of flow of the throttling apertures when the cam bushing is being shifted against the action of the compression spring. Still another very suitable design of a throttle valve may be attained by providing the damping piston with throttling apertures and an annular recessed collar on which a piston ring is slidable in the axial direction against spring action so that, when the cam bushing is being shifted in the direction of the action of the compression spring, this piston ring will lag relative to the movement of the piston and thereby uncover a plurality of apertures which are provided within the wall of the collar and terminate into the damping chamber of the cylinder, while when the cam bushing is being shifted in the opposite direction, this piston ring will close these apertures.

The mechanism according to the present invention may be applied to gears which are provided with such a pressure-applying device only on one shaft and also to those which have such devices on both shafts. It is especially of advantage in those gears in which the strength of the control force which is hydraulically produced in accordance with the load to which the gears are subjected depends upon the position of one of the slidable conical disks. As soon as, due to an insufficient pressure, the slidable disk of these gears moves during the torque reversal in the direction toward the cam bushing, the control force will be immediately very strongly increased since, in such a control device where the control force is also controlled in accordance with the distance of travel of the disk, a very small displacement of the disk will result in an extremely steep increase in pressure within the pressure chamber which will insure that the conical disk will remain substantially in the position to which it has once been adjusted.

The control forces which may be produced at the driving side as well as the driven side of such gears as are described in detail in the mentioned copending application therefore contribute during a torque reversal to the effect of the damping device according to the present invention in supplying an additional fluid pressure during the movements of the cam bushings on both shafts whenever a higher pressure against the slidable pulley disk is required.

These and other objects, features, and advantages of the present invention will become further apparent from the following detailed description thereof, particularly when the same is read with reference to the accompanying drawings, in which—

FIGURE 2 shows a cross section similar to FIGURE 1 of one set of cone-pulley disks and the associated control mechanism according to a modification of the invention;

FIGURES 3 and 4 show partial cross sections of the throttle valve as used in the embodiment according to FIGURES 1 and 2 in two different operating positions;

FIGURE 5 shows a view similar to FIGURE 2 with a control mechanism according to a further modification of the invention.

FIGURES 6 and 7 shows partial cross sections of the throttle valve as used in the embodiment according to FIGURE 5 in two different operating positions;

FIGURE 8 shows a cross section of a mechanism similar to FIGURES 2 and 5, but with a throttle valve according to a third modification;

FIGURES 9 and 10 show partial cross sections of the throttle valve according to FIGURE 8 in two different operating positions; while FIGURE 11 shows a partial cross section of a different type of gear with crossing shafts.

Figure 1:
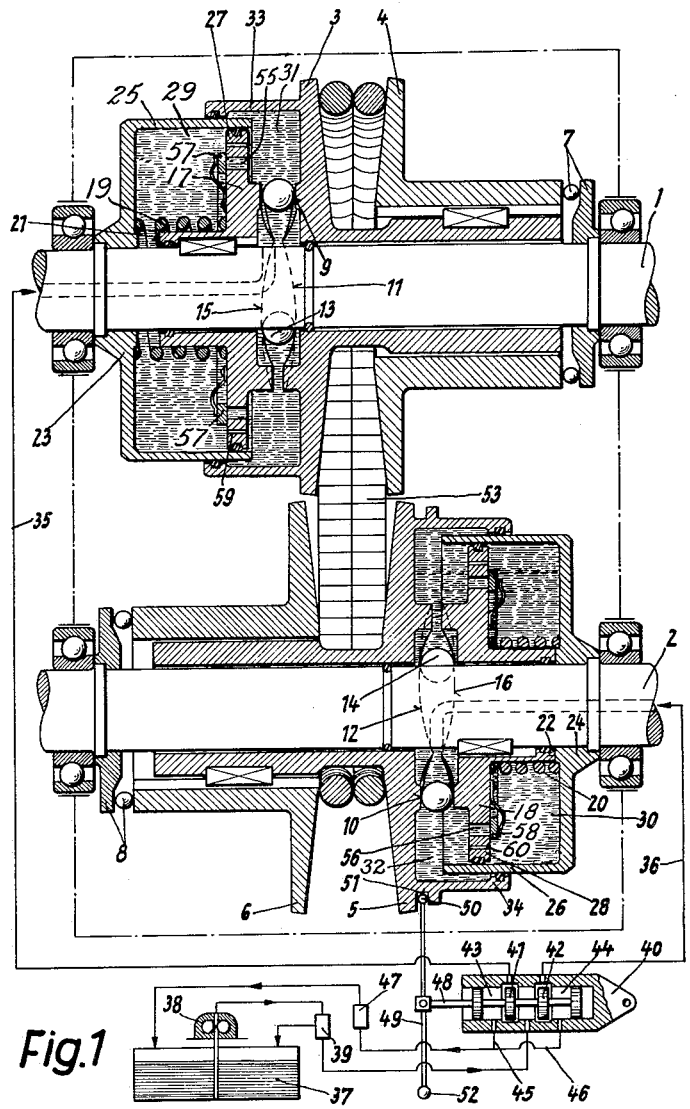
FIGURE 1 shows partly diagrammatically a longitudinal cross section of the two shafts of an infinitely variable gear with conical pulley disks, and of the control mechanism according to the invention.

Referring to the drawings, FIGURE 1 shows an infinitely variable cone-pulley gear which is driven by a belt or link chain and comprises two parallel shafts 1 and 2, each of which carries a pair of conical pulley disks 3, 4 and 5, 6, respectively. The conical disks 3 and 5 are mounted on their respective shafts 1 and 2 so as to be rotatable as well as slidable thereon in the axial direction, while the conical disks 4 and 6 are connected to disks 3 or 5, respectively, so as to be nonrotatable but slidable in the axial direction relative thereto, and these disks 4 and 6 are supported against a movement in the axial direction relative to shafts 1 and 2 by ball bearings 7 and 8, respectively. The two pulleys formed by the two pairs of conical disks 3, 4 and 5, 6 are connected to each other by an endless belt or chain 53, hereafter referred to as a "belt." On the faces of their hubs 9 and 10, each disk 3 and 5 is provided with cam surfaces 11 or 12, respectively which are operatively associated by means of rolling bodies in the form of balls 13 or 14 with corresponding cam surfaces 15 or 16 on the face of a bushing 17 or 18, respectively. These cam bushings 17 and 18 are mounted on shaft 1 or 2, respectively, and are slidable thereon against the action of a compression spring 19 or 20. When cam bushings 17 and 18 are in their normal position their outer end surfaces 21 and 22 will be in engagement with end stops 23 and 24 to prevent the bushings from sliding further in the axial direction. This is illustrated particularly by bushing 18, while the other bushings 17 is shown in the position in which it is disposed at the time of the torque reversal when it is shifted by the compression spring 19 against the conical disk 3 and has moved balls 13 to the lowest point on cam surfaces 11 and 15.

At the side facing toward the slidable pulley disk 3 or 5, respectively, each shaft 1 and 2 carries a damping cylinder 25 or 26 in the form of a cup-shaped member which rests against a flange on the respective shaft and also forms the end stop 23 or 24, respectively. Cam bushings 17 and 18 form damping pistons 27 and 28 which separate the damping chamber 29 or 30 in cylinder 25 or 26 from a pressure chamber 31 or 32, respectively, which is formed at one side by the peripheral wall of cylinder 25 or 26 and at the other side by the slidable pulley disk 3 or 5 and a flange 33 or 34 thereon.

These pressure chambers 31 and 32 contain a pressure fluid which is supplied thereto from a container 37 by a gear pump 38 through a pressure-relief valve 39, a control cylinder 40, the diagrammatically indicated pressure lines 35 and 36, and suitable bores in shafts 1 and 2. Control cylinder 40 contains two control pistons 41 and 42. When these pistons are in a central position in cylinder 40, they permit the pressure fluid to flow into pressure lines 35 and 36 and also to pass around control pistons 41 and 42 and then to flow back from chambers 43 and 44 through return lines 45 and 46 and an adjustable throttle valve 47 to container 37. If control pistons 41 and 42 are shifted only slightly in one direction, for example, toward the left, the flow of pressure fluid to line 36 will be throttled, while at the same time line 36 will be connected with return line 46. The pressure of the pressure fluid in chamber 32 is therefore primarily determined by the particular adjustment of throttle valve 47. At the same time, however, the pressure fluid will be allowed to pass more freely into pressure line 35, while its flow into cylinder chamber 43 will be throttled. A pressure will thus be built up in pressure chamber 31 of the pulley on shaft 1 which is dependent upon the amount of axial displacement of control pistons 41 and 42 in control cylinder 40. Piston rod 48 of control pistons 41 and 42 is connected to a two-armed lever 49, one end 50 of which engages into an annular groove 51 on the slidable pulley disk 5, while its other end 52 serves as a control lever which may be adjusted either by hand or by other means, not shown, for example, a threaded spindle, a servo-control mechanism or the like.

Insofar as it has been described above, the gear according to FIGURE 1 operates as follows: Let us assume that shaft 1 is the shaft which is connected to the driving motor, while shaft 2 is connected to the machine which is to be driven. Since belt 53 as illustrated in FIGURE 1 runs on the driven side of the gear at the smallest possible radius of pulley 5, 6, shaft 2 will be driven at the highest rate of speed. Since pulley disks 5 and 6 are spaced from each other at the greatest possible distance, balls 14 will lie at the bottom of cam surfaces 12 and 16. On the driving side of the gear, that is, on shaft 1, pulley disks 3 and 4 are moved to the smallest possible distance toward each other and, due to the fact that cam bushing 17 is assumed to be shifted to the right in the axial direction, balls 13 are likewise disposed at the bottom of cam surfaces 11 and 15. If shaft 1 is then rotated, it also rotates cam bushing 17, whereas the conical pulley disks 3 and 4 will at first remain at a standstill. Balls 13 will then run upwardly along the opposite cam surfaces 11 and 15 and thereby force cam bushing 17 back in the axial direction to the left until its end surface 21 engages with end stop 23. Since there is thus no further possibility of movement of cam bushing 17, the torque acting on shaft 1 will be transmitted from cam bushing 17 through balls 13 to pulley disks 3 and 4, while at the same time a pressure will be exerted in the axial direction upon the conical disk 3 which is of a strength in proportion to that of the torque on shaft 1 and is also dependent upon the particular gear ratio to which the gear has been adjusted, due to the fact that the inclination of said cam surfaces is not constant and that the balls 13 will have run upwardly along said cam surfaces to an extent which is defined by the position of slidable disk 3, the position of which in turn defines the gear ratio. Due to this pressure, belt 53 will be clamped between the slidable pulley disk 3 and the axially fixed pulley disk 4 with such a force that the full driving power of belt 53 will be transmitted to pulley 3, 4. At the same time, balls 14 on the driven side of the gear will also tend to run upwardly along cam surfaces 12 and 16 under the effect of the torque of the driven shaft, but will be able to do so only by changing the radius of engagement of belt 53 with pulley disks 5 and 6. The torque on shaft 2 is then transmitted from this shaft through cam bushing 18 and balls 14 to the slidable pulley disk 5, while at the same time a pressure force is produced which is of a size in proportion to the torque on shaft 2 and also dependent upon the particular gear ratio as set, that is, dependent upon the inclination of that part of the cam surfaces (here the bottom) against which the balls 14 bear.

Assuming that pressure chamber 31 on shaft 1 does not contain any pressure, the gear ratio of the gear would be changed since the spreading force exerted by belt 53 upon the conical pulley disks 3 and 4 is always greater than the axial pressure produced by cam bushing 17 and exerted upon disk 3. This would result in a reduction of the radius of engagement of belt 53 with the driving pulley disks 3 and 4 and a corresponding increase of the radius of engagement of belt 53 with the driven pulley disks 5 and 6 since the slidable disks 3 and 5 would both yield toward the left, as seen in FIGURE 1. The consequence of the movement of slidable disk 5 to the left would be that the control pistons 41, 42 would be shifted through the two-armed lever 49 toward the left, whereby, as more fully described in the co-pending application Serial No. 826,087, filed on July 9, 1959, now Patent No. 2,993,385 and entitled "Control Device of Infinitely Variable Gears," even at the slightest movement of these pistons a control pressure would be built up in pressure chamber 31 on drive shaft 1 which would be sufficient to prevent any noticeable further change in the gear ratio. At the same time, the pressure would decrease in pressure chamber 32 to such an extent that only the minimum pressure would prevail which is determined by throttle valve 47.

If the torque on the driven shaft 2 is increased, the slidable pulley disk 5 will likewise tend to escape toward the left with the result, as already mentioned above, that the pressure in pressure chamber 31 on drive shaft 1 will immediately increase accordingly so that the gear ratio as set will remain unchanged.

If the gear ratio should be changed, lever 49 must be shifted at its end 52 toward the right, whereby control pistons 41 and 42 will also be shifted toward the right with the result that the pressure in pressure chamber 31 will decrease and the slidable pulley disks 3 and 5 will be shifted toward the left. This will result in a change in the radii of engagement of belt 53, while at the same time the control pistons 41 and 42 will again return to the starting position so that a state of equilibrium will again be produced between the spreading force generated by belt 53 on the driving side and the pressure against the belt which counteracts these spreading forces and is produced by cam bushing 17 and the control force generated by the pressure medium in pressure chamber 31. When the gear ratio is thus being changed, balls 13 on the driving side will move along cam surfaces 11 and 15 slightly inwardly toward the cam bottom, while balls 14 on the driven side will move a small distance away from the cam bottom and upwardly along cam surfaces 12 and 16.

Assuming that the direction of the torque on the driven shaft 2 is suddenly reversed, this shaft and cam bushing 18 will carry out a rotation relative to pulley disks 5 and 6. Balls 14 will then run back into the cam bottom, while the cam bushing 18 will be shifted toward the left by the force of spring 20 and thereby maintain balls 14 in engagement with cam surfaces 12 and 16. Since the direction of the torque is then also reversed at the driving side of the gear, a relative rotation also occurs between shaft 1 with cam bushing 17 and pulley disks 3 and 4, so that balls 13 will likewise run down toward the cam bottom, while being held in engagement with cam surfaces 11 and 15 by the action of compression spring 19 which shifts cam bushing 17 toward the right. In the subsequent course of the operation, balls 13 and 14 will run on both the driven and driving sides of the gear upwardly along the inversely directed cam surfaces 11, 15 and 12, 16 and thereby again force cam bushings 17 and 18 backwardly until their end surfaces 21 and 22 engage with stop surfaces 23 and 24.

The axial displacements of cam bushings 17 and 18 occurring at a torque reversal as just described are controlled, on the one hand, by compression springs 19 and 20 and, on the other hand, by a damping mechanism as subsequently described.

As already mentioned above, each cam bushing 17 and 18 is designed in the form of a damping piston 27 or 28 which separates the damping chamber 29 or 30 of cylinder 25 or 26 from the pressure chamber 31 or 32, respectively. Each damping piston 27 and 28 is provided with a plurality of peripherally spaced apertures 55 and 56 of a relatively large cross section which are closed at the side facing toward damping chamber 29 or 30 by an annular spring-loaded valve plate 57 or 58. Each damping piston 27 or 28 is further provided with a plurality of throttling apertures 59 or 60 of a relatively small cross section. As illustrated in detail in FIGURES 3 and 4, valve plate 57 or 58 will be lifted from piston 27 or 28 when the respective cam bushing is being shifted under the action of compression spring 19 or 20 in the direction toward the slidable pulley disk 3 or 5. The pressure fluid can then pass freely from pressure chamber 31 or 32 through apertures 55 or 56 into damping chamber 29 or 30, respectively. At the beginning of the return movement of cam bushing 17 or 18 against the action of compression spring 19 or 20, valve plate 57 or 58 will again close apertures 55 or 56 whereby the movement of the cam bushing will be strongly retarded due to the opposing force of spring 19 or 20 and to the fact that the pressure fluid can now flow back from damping chamber 29 or 30 to pressure chamber 31 or 32 only by passing through the throttling apertures 59 or 60. Consequently, a strong force will be exerted in the axial direction upon the conical pulley disk 3 or 5, so that the required pressure against belt 53 will be maintained. Furthermore, at the end of the return movement of cam bushing 17 or 18, its end surface 21 or 22 will engage gradually and practically without impact with the stop surface 23 or 24, respectively.

In the event that this return movement of, for example, cam bushing 17 on the driving side of the gear is retarded to such an extent that the pressure of the bushing will not be sufficient and the slidable pulley disk 3 and 5 will have the tendency to yield toward the left, control pistons 41 and 42 will also move toward the left with the result that a steep rise in pressure will be immediately produced in pressure chamber 31 whereby the effect of damping piston 27 or 28 of cam bushing 17 or 18 will be amplified. The same procedure equally applies to the corresponding parts on the driven side of the gear.

The mechanism according to the present invention therefore insures a smooth, shockless movement of the cam bushings when the torque is being reversed, and at the same time also the generation of a sufficient pressure against belt 53.

FIGURE 2 illustrates a modification of the pulley structure on shaft 2. While in the embodiment according to FIGURE 1, flange 34 on the slidable pulley disk 5 overlaps the damping cylinder 26 on the outside thereof, the cylindrical flange 65 according to FIGURE 2 extends into damping cylinder 26.

FIGURES 3 and 4 have already been described with reference to the embodiment according to FIGURE 1 and illustrate the manner of operation of throttle valve 57 or 58 on damping piston 27 or 28 of cam bushings 17 or 18, respectively.

FIGURES 5 to 7 and 8 to 10, respectively, illustrate two further modifications of the one-way throttle valve and their manner of operation. FIGURES 5 and 8 are similar to the upper half of the gear on shaft 1 in FIGURE 1, while FIGURES 6 and 7, and 9 and 10 are similar to FIGURES 3 and 4, respectively. Cam bushing 17 of the embodiment according to FIGURES 5 to 7 forms a damping piston 70 which is provided with an annular recessed collar on which a piston ring 72 is mounted so as to be slidable in the axial direction against the action of a spring. When cam bushing 17 is being shifted in the direction of force of compression spring 19, piston ring 72 will lag relative to piston 70, as shown particularly in FIGURE 7, and thereby free the apertures 73 which extend radially through the wall of collar 71 into damping chamber 29. When cam bushing 17 moves in the opposite direction, these apertures 73 will again be immediately closed by piston ring 72. Damping piston 70 is further provided with throttling apertures 74 through which the pressure fluid must flow during the return movement of the cam bushing. The principle of operation of this lag valve is the same as that of the plate valve as described with reference to FIGURES 1, 3, and 4.

The damping piston on cam bushing 17 according to FIGURES 8 to 10 is again provided with a plurality of apertures 55 similar to those in FIGURE 1, which are covered by a spring-loaded valve plate 75. This valve plate is, in turn, provided with throttling apertures 76 into which throttling pins 77 extend which are mounted on the end wall of damping cylinder 25 and taper to a point at the front ends which are adapted to enter into apertures 76. When cam bushing 17 moves back in the direction toward the end stop 23, the throttling apertures have at first a relatively large cross section, but the closer the bushing moves toward stop 23, the more these apertures 76 will be closed by throttling pins 77. The damping action therefore increases gradually.

FIGURE 11 finally illustrates that the invention is not limited to pulley gears with slidable conical disks, but that it may also be applied to other types of infinitely variable gears. In this particular example, the gear concerned is a friction gear in which the drive shaft 100 and the driven shaft 103 are disposed at right angles to each other. The driving part of the gear on drive shaft 100 is of the same construction as the left part of the drive-pulley unit on shaft 1 according to FIGURE 1, while the driven part of the gear is here designed in the form of a conical friction disk 101 which is in direct friction-engagement with the conical driving disk 102. The change in gear ratio is produced in a known manner by shifting the driven disk 101 in the axial direction along its shaft 103 by means of a threaded spindle, whereby driving disk 102 will also be shifted along its shaft 100. The principle of operation of damping the movement of the cam bushing during the torque reversal is substantially the same as that previously described with reference to FIGURES 1 and 10.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In an infinitely variable gear mechanism having a driving shaft and a driven shaft, at least one conical disk on each shaft and slidable along and rotatable on said shaft, means connecting said disks to transmit a driving force from one shaft to the other, and load-responsive means operatively connected to at least said conical disk on said driving shaft to force said disk toward said connecting means and to maintain said disk substantially in a preset position even if the load changes, said load-responsive means comprising a cylinder rigidly secured to at least said driving shaft, a second cylinder axially slidable and rotatable with said disk on said driving shaft, each of said two cylinders having one open end, said cylinders being telescopically slidable at said open ends one within the other and relative to each other, a source of fluid under pressure, a line connecting said source to one of said cylinders, means operatively associated with said line and operatively connected to one of said slidable disks and controlled thereby to regulate the fluid pressure in said cylinders for automatically maintaining a predetermined transmission ratio between said shafts, deliberately adjustable means operatively connected to said regulating means for varying the transmission ratio, a bushing on said driving shaft and slidable along and rotatable with said shaft within said cylinders, a damping piston rigid with said bushing and slidable therewith within said cylinders and forming therein a pressure chamber and a damping chamber at opposite sides of said piston, said line connecting said source to said pressure chamber, a plurality of helical cam surfaces of a changing pitch arranged in pairs on the opposite faces of said slidable disk and said bushing, the two cam surfaces of each pair being arranged inversely to each other in the circumferential direction in accordance with the two possible directions of the torque acting on said shaft, rollable bodies between said cam surfaces and in engagement with a particular point of one of said cam surfaces of each pair on the opposite faces of said slidable disk and said bushing, respectively, a compression spring acting upon said bushing and piston tending to move the same in the direction toward said slidable disk and maintaining said cam surfaces at all times in engagement with said rolling bodies, a stop member limiting the sliding movement of said bushing and piston in the opposite direction, at least one throttling aperture of small cross section in said piston, at least one aperture of large cross section in said piston, and one-way valve means on said piston for opening and closing said large aperture and adapted to open to permit the pressure fluid to pass freely from said pressure chamber to said damping chamber when, after the torque on said shaft has changed its direction and said rolling bodies have to travel from the particular point on one of the cam surfaces of each pair to the corresponding point on the other cam surface forming a pair with the first-mentioned cam surface, said cam bushing and piston are first shifted in the direction toward said slidable disk by the force of said spring, said valve means being further adapted to close said large aperture when said bushing and piston then move back to the normal position in the opposite direction and then to force said pressure fluid to return under a high pressure from said damping chamber to said pressure chamber by passing through said throttling aperture.

2. A gear mechanism as defined in claim 1, further comprising a fixed conical disk mounted on each of said shafts and rigidly connected thereto, said slidable disk being operatively associated with and slidable relative to said fixed disk, said slidable and fixed disks on each shaft together forming a cone pulley, said connecting means forming an endless beltlike member connecting the two pulleys, all of said load-responsive means forming separate means operatively connected to said slidable disk on each of said shafts.

3. A gear mechanism as defined in claim 1, in which said damping piston is provided with a plurality of said large apertures and a plurality of small throttling apertures, said valve means comprising an annular spring-loaded valve plate adapted to open and close all of said large apertures.

4. A gear mechanism as defined in claim 1, in which said damping piston is provided with a plurality of said large apertures, said valve means comprising an annular spring-loaded valve plate adapted to open and close all of said large apertures, said valve plate having a plurality of said small throttling apertures therein, and tapering throttling pins rigidly secured to said damping cylinder and extending into said throttling apertures and adapted gradually to reduce the cross sectional passage of said apertures when said cam bushing and piston are shifted in the direction opposite to the direction of force of said compression spring.

5. A gear mechanism as defined in claim 1, in which said damping piston has an annular recessed collar thereon and said larger apertures being therein and terminating into said damping chambers, a piston ring slidably mounted within the recessed part of said collar and adapted to open and close said apertures in said collar, a spring acting upon said piston ring and in the same direction as said compression spring, said piston ring being adapted to lag relative to said piston when said bushing and piston are being shifted in the direction toward said slidable disk by the force of said compression spring so as then to uncover said apertures in said collar, said piston ring being adapted to close said apertures in said collar when said cam bushing and piston are shifted in the opposite direction.

References Cited in the file of this patent
UNITED STATES PATENTS

| | | |
|---|---|---|
| 2,233,967 | Wellton | Mar. 4, 1941 |
| 2,346,868 | Perry | Apr. 18, 1944 |
| 2,651,208 | Karig | Sept. 8, 1953 |
| 2,779,203 | Eubanks | Jan. 29, 1957 |
| 2,810,296 | Long | Oct. 22, 1957 |
| 2,887,893 | Claas | May 26, 1959 |